Patent …

United States Patent [19]
Nakane et al.

[11] Patent Number: 4,587,533
[45] Date of Patent: May 6, 1986

[54] INFORMATION RECORDING MEDIA

[75] Inventors: Yasuaki Nakane, Tokyo; Masataka Kitagawa, Kanagawa; Tadashi Kiyomiya, Saitama; Tetsunosuke Yanada, Kanagawa, all of Japan

[73] Assignee: Sony Corporation, Tokyo, Japan

[21] Appl. No.: 633,519

[22] Filed: Jul. 23, 1984

[30] Foreign Application Priority Data

Jul. 25, 1983 [JP] Japan ................................ 58-135488

[51] Int. Cl.$^4$ ...................... G01D 15/34; A04N 5/76; G03C 1/78; G03F 7/00
[52] U.S. Cl. .................................. 346/135.1; 369/275; 369/283; 430/271; 430/495; 430/945; 428/425.6; 428/425.8; 428/913; 428/425.9
[58] Field of Search ..................... 346/135.1; 369/275, 369/283; 430/271, 495, 945; 428/425.6, 425.8, 425.9, 913

[56] References Cited

U.S. PATENT DOCUMENTS

| 4,268,840 | 5/1981 | Schank et al. | 346/135.1 |
| 4,310,919 | 1/1982 | Slaten | 369/275 |
| 4,473,633 | 9/1984 | Wada et al. | 430/271 |
| 4,499,178 | 2/1985 | Wada et al. | 430/495 |

Primary Examiner—E. A. Goldberg
Assistant Examiner—Gerald E. Preston
Attorney, Agent, or Firm—Hill, Van Santen, Steadman & Simpson

[57] ABSTRACT

An information recording medium for use with focused laser beams modulated with recorded information signals comprising a substrate having a recording layer composed of at least two layers, the first being formed on the substrate and the second being formed over the first. The substrate and the first layer have the property of high transmittance to laser beams and the second layer is composed of a metal which is predominantly a low melting metal capable of absorbing the laser beams and readily forming an alloy with the material of the first layer, the thickness of the first layer being such that the reflectance of the laser beams entering from the side of the substrate is lowered by the interference effect caused by repetitive multiple reflections. The metal of the second layer is thus alloyed to the first layer due to the focused irradiation of the laser beams from the substrate to the recording layer, changing the conditions for the multiple reflections and changing the reflectance in the recording layer as viewed from the substrate, thereby carrying out the recording of the information.

12 Claims, 5 Drawing Figures

Thickness for the layer (7) (Å)

INFORMATION RECORDING MEDIA

BACKGROUND OF THE INVENTION

1. Field of the Invention

The present invention is directed to an information recording medium suitable for use in various types of imaging recording files and large capacity memory means including video disks and digital audio disks. It relates in particular to the so-called direct read after write (DRAW) type information recording medium capable of recording and reproducing information.

2. Description of the Prior Art

Various DRAW type information recording media have been proposed. One example of such a recording medium uses laser beams modified by recording information signals which are irradiated on a thin membrane of a low melting metal formed on a substrate to melt or evaporate the metal membrane under the concentrated heating in accordance with the information contained therein, thereby forming apertures or recording bits in the metal membrane, so that the recording is carried out as a change in the configuration of the medium. However, formation of the recording bits in this way requires a large beam power for writing and in addition involves a difficulty in controlling the shape of the recording bits resulting from melting to increase the noise level and lower the image resolution performance, thus making it difficult to obtain high density recording.

There has also been suggested a recording medium which utilizes a change resulting in the optical characteristics instead of a change in the configuration of the recording layer for writing and reading purposes. For example, in the medium disclosed in Japanese Patent Laid-Open No. 138145/1977, recording is performed in the form of local crystallization in an amorphous recording layer caused by the heating of recording laser beams and the recorded information is read out using the difference in optical characteristics between the crystallized and the non-crystallized regions. However, the recording due to the crystallization of the amorphous recording layer had to be done under a condition of gradual heating and gradual cooling to cause crystallization. In the case of a disk-like information recording medium, for example, of 300 mm diameter and using signals of about 5 MHz and rotating the disk on the order of 1800 rpm, this corresponds to a recording condition of rapid heating and rapid cooling. Accordingly, it is difficult to achieve any of the desired crystallization. On the other hand, those materials which are capable of crystallizing under such a high speed recording condition are unstable and are not suitable for storage for a long time. Particularly, in the case where the recording layer of the amorphous material is formed by vapor deposition, the material which has been formed into such an amorphous layer upon vapor deposition does not go through the step of atom rearrangement for crystallization and the desired stable state of the recording layer in the amorphous form is that of the crystalized form. Consequently, the amorphous phase in the non-recording region or in the not yet recorded region is gradually crystallized during long-time storage to cause lack of stability and a reduction in the signal-to-noise ratio. Further, since there is no substantial change obtained in the optical characteristics merely by the crystallization of the amorphous layer, it is impossible to obtain high resolution, a high S/N ratio, and a high recording density.

A further example of recording medium is disclosed in Japanese Patent Laid-Open No. 22095/1982 wherein the recording layer comprises a first layer composed of Au or Ag and a second layer composed of In or Sn, and solid phase diffusion is caused between the first and second layers by heating with the irradiation of recording laser beams. The recorded information is read out due to the change in the reflectance between the recording region where the solid phase diffusion is caused and the other region where no such solid phase diffusion exists. However, since the reflectance is mainly determined by the material of the second layer disposed on the side where the reading laser beams are entered in this mode of recording, an insufficiently large change can be obtained upon reading out the recorded information. Therefore, there is no high resolution, an insufficiently high S/N ratio, and an insufficiently high recording density. Since the solid phase diffusion is dependent on temperature and time, the solid phase diffusion proceeds gradually in the non-recorded region or not yet recorded region during a long time storage of the recording medium and thereby worsens the S/N ratio.

In a still further example of a recording medium, there is disclosed in Japanese Patent Laid-Open No. 18031/1982 a dual layer structure composed of a high reflection membrane having a higher reflectance to reading beams and a low reflection membrane having a lower reflectance and a higher absorbance to writing beams on a transparent substrate. Recording laser beams are irradiated upon writing on the side of the lower reflection membrane to cause alloying or mixing between both of the metals in the high reflection membrane and the low reflection membrane by heating of the laser beams. Information is recorded by denaturing the high reflection membrane due to alloying or mixing and thereby reducing the reflectance. The information is then read out by irradiating the reading beams on the side of the high reflection membrane and utilizing the difference in reflectance between the low reflectance region previously written and denatured and the other regions. However, since the recording and the reading laser beams have to be irradiated on opposite sides in this recording medium, there results the disadvantage of an increase in the size of the recording and reproducing apparatus and a complicated handling for the recording medium.

It is generally required that recording laser beams and, in some instances, reading laser beams, be condensed or focused on the recording layer, a light absorbing layer for use in heating the recording layer, or the reflection layer. In this case, it is desirable that the laser beams be irradiated on the side of the substrate having a larger thickness, for example, about 1 mm on which the above-mentioned layers are deposited in order to avoid as much as possible undesired effects resulting in spots in the laser beam focusing area such as are caused by minute scratches, shadows of dusts and scattering on the surface of the information recording medium. If the laser beams are irradiated on the side of the substrate, a certain distance can be obtained between the area where the laser beams are focused and the surface of the substrate, that is, the surface of the medium where such scratches or dusts are present. The surface is kept out of the focal depth of the focusing lens system and, accordingly, reduces the effects of the scratches and the dusts on the focusing area. However, it is generally impossible to use such a mode of recording and reproduction in an information recording medium of the conventional DRAW type.

While it is preferred to use a transparent substrate for the information recording medium, for example, a plastic substrate, from the point of view of economy and also for ease of handleability, deformation of the substrate is inevitable in a large diameter disk due to the residual inner stresses resulting from molding of the substrate, and swelling due to humidity or the like which gives a significant undesired effect on the energy distribution of the focused laser beams and provides a great deal of trouble in recording and reproducing the information. To prevent the deformation of the substrate, it is extremely effective to sandwich a recording layer between a pair of opposed substrates made of identical materials and in the same configuration. However, in the recording medium of the foregoing type for recording information depending on a bit-producing change in the configuration of the medium through melting and evaporation of the metal layer, the substrate of the sandwich structure cannot be used because it requires a space for permitting the configurational change, that is, a space for accommodating the bulge of the metal at the circumferential edge of bits caused by the surface tension accompanying bit formation.

SUMMARY OF THE INVENTION

The present invention provides an information recording medium capable of overcoming the foregoing drawbacks in the conventional DRAW type information recording medium wherein recording is carried out by means of focusing laser beams.

One of the objects of the invention is to provide an information recording medium capable of recording at a lower beam power and reproducing at high resolution, high output and high S/N (C/N) ratio, having an excellent stability, and no aging reduction in the S/N ratio. Another object of the invention is to provide an information recording medium capable of using irradiating laser beams from the side of the substrate for both recording and reproduction and putting the recording layer between paired substrates to constitute a dual type information recording medium.

These objectives are achieved by an information recording medium in which a recording layer is disposed on a substrate, and laser beams whose intensity is modified depending on the recording information are irradiated under focusing for information recording. The recording layer comprises a first layer and a second layer deposited on the substrate successively, the substrate and the first layer having a high transmittance to the laser beams and the seond layer being made of a metal which is essentially a low melting metal which readily alloys with the metal of the first metal layer. The thickness of the first layer is chosen such that the reflectance of the layer to the laser beams entering on the side of the substrate is lowered by utilizing an interfering effect caused by repetitive multiple reflections. Accordingly, metals in the first and second layers are alloyed under the focusing irradiation of the laser beams to change the conditions for the foregoing repetitive multiple reflections and change the substantial reflectance of the recording layer as viewed on the side of the substrate to thereby carry out the information recording.

BRIEF DESCRIPTION OF THE DRAWINGS

These and other objects and advantages of the present invention will become clearer from the following description of the attached sheets of drawings in which.

DESCRIPTION OF THE PREFERRED EMBODIMENTS

A preferred embodiment of the information recording medium according to the present invention will now be described with specific reference to the drawings. In the embodiment illustrated, a dual face type recording structure is shown in which the recording of information and reading of the recorded information can be made from the same side on each of the main surfaces respectively so that the recording capacity per sheet of information recording medium can be increased.

Figure 1:
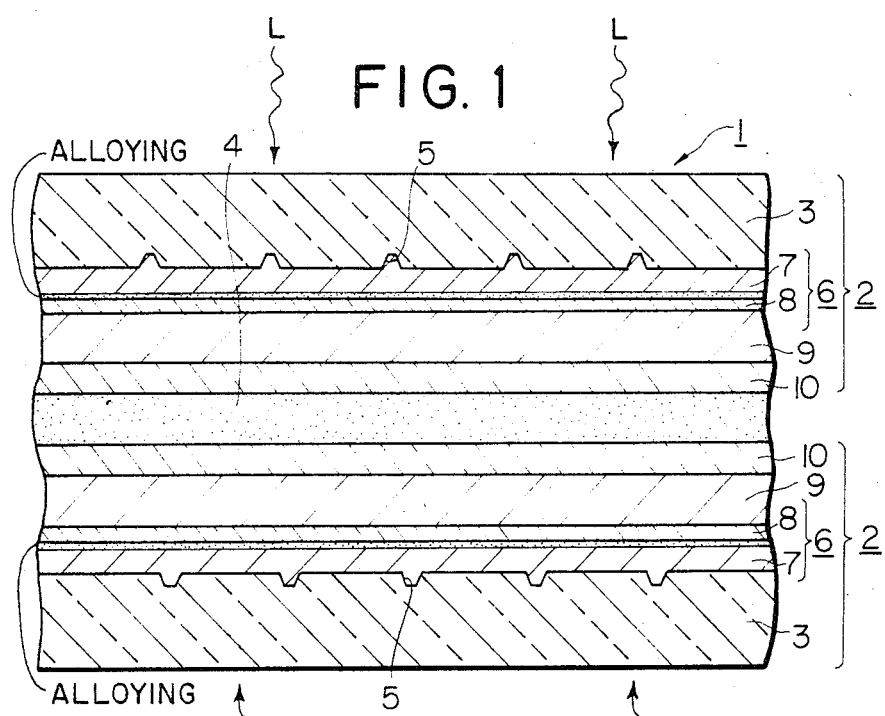
FIG. 1 is an enlarged schematic cross-sectional view illustrating one embodiment of the invention.
Figure 2:
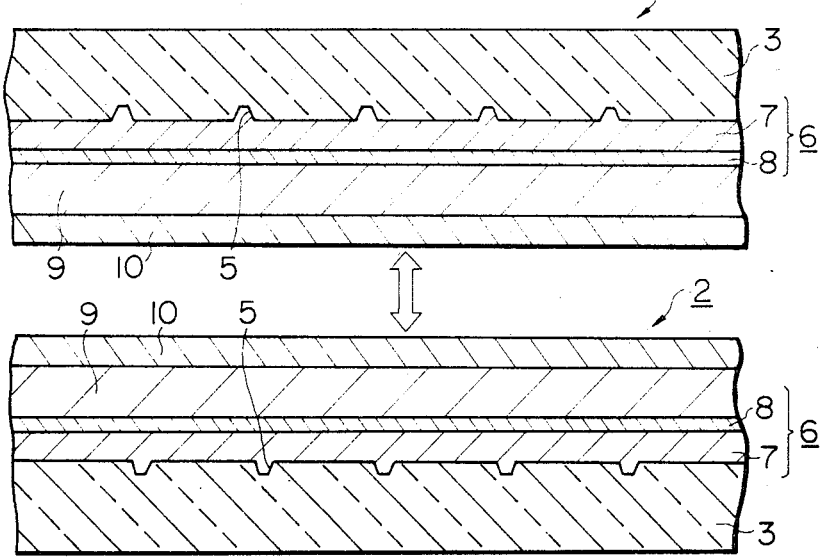
FIG. 2 is an exploded cross-sectional view of the medium shown in FIG. 1.

In FIG. 1, the dual face type information recording medium is illustrated generally by reference numeral 1. Medium 1 comprises a pair of recording medium elements 2 each having an identical structure as shown in FIG. 2, the two elements being bonded together by means of adhesives 4 at their interface in inverted relation with respect to their substrates 3.

The substrate 3 for each of the elements 2 is composed of a transparent material having a high transmittance to the recording and reading laser beams. Such substrates may consist, for example, of acrylic, polycarbonate, or similar resin substrates such as a polymethylmethacrylate substrate. Guide grooves 5 are formed on one surface of the substrate 3 upon molding of the substrate, the groove 5 having a depth corresponding to about $\frac{1}{8}$ to $\frac{1}{4}$ of the wavelength of the laser beams employed. A recording layer 6 is deposited on the substrate 3 on the side having the guide grooves 5. The recording layer comprises a first layer 7 deposited on the substrate 3 and a second layer 8 deposited adjacent to the first layer. A light permeable layer 9 having a high transmittance to the laser beams employed and a reflection layer 10 for the same laser beams are successively deposited on the recording layer 6. These layers 7, 8, 9 and 10 can be formed by means of vacuum deposition, electron beam deposition, sputtering or the like.

When information is recorded on the medium, recording laser beams are irradiated on each of the elements 2 from the side of substrate 3, specifically, from the upper substrate 3 for the upper element 2 and from the lower substrate 3 for the lower element 2 as shown in FIG. 1. The laser beams are focused toward the recording layer 6. Then, the focused laser beams are efficiently absorbed and converted into heat in the second layer 8 of the recording layer 6. The first and second layers 7 and 8 are alloyed by the heat to cause a change in their optical characteristics, that is, in the reflectance and thereby provide the information recording.

In the structure described, the second layer 8 of the recording layer 6 is composed of a low melting metal such as Te, Bi, Sb, or In or a low melting compound of these metal elements consisting mainly of the metals such that the second layer sufficiently absorbs the laser beams and is alloyed with the first layer 7 to change the optical characteristic of the layer 7. As the second layer 8, there can be used Bi, or BiTe$_x$, where x is greater than 0.1 but less than 3 where a semi-conductor laser of 700-800 nm of wavelength band is employed. It is desirable that the thickness of the second layer be in the range from about 100 to 500 Å.

The first layer 7 of the recording layer 6 is made of a material which is as permeable to the laser beams employed as possible, and is easily alloyed with the material of the second layer. The first layer 7 is preferably made of a chalcogenide glass and composed of a material which forms a polyphase alloy when combined with a second layer 8. The first layer 7, can be made of SbSe$_y$ where y is greater than 0.5, but less than 2 in the case where the second layer 8 is made Bi or BiTe$_x$.

The thickness of the first layer is such that substantial reflectance is lowered and the recording laser beams can be absorbed efficiently in the second layer 8 upon irradiation of the laser beams from the side of substrate 3, resulting from repetitive multiple-reflection interference resulting at the interface between the first layer 7 and the substrate and at the interface between the layer 7 and the second layer 8. Although it is more advantageous as reflectance is lowered in order to improve the absorbing efficiency for the recording laser beams, a certain amount of reflected light is necessary as a detection light for the stable operation of the auto-focusing or auto-tracking mechanism for the laser beams in the recording and reproducing apparatus. In view of the foregoing, the reflectance is desirably in the range of 10-20% in the unrecorded state.

It is necessary that the heat capacity of the recording be small and the thermal diffusion due to heat conduction low. It is also necessary that the absorbance of the irradiated laser beams is high in order to enable the information recording at a low power. These constitute necessary conditions together with the recording reaction itself, that is, a high sensitivity in the alloying effect between the first and second layers 7 and 8.

The light permeable layer 9 may be composed of the same chalcogenide glass which is used in the first layer 7 having a low heat conductivity.

The reflection layer 10 is formed with a metal layer material having a large difference with respect to refractive index and absorption coefficient as compared with those of the light permeable layer 9 so as to provide a high degree of reflectance to the laser beams at the interface between the layer 10 and the light permeable layer 9. For example the layer 10 may be made of a metal such as Al, Sn, Ag, and Au. The thickness of the reflection layer 10 is selected such that the amount of the laser beams that leak to the external side permeating through the layer 10 is negligibly small.

Figure 3:
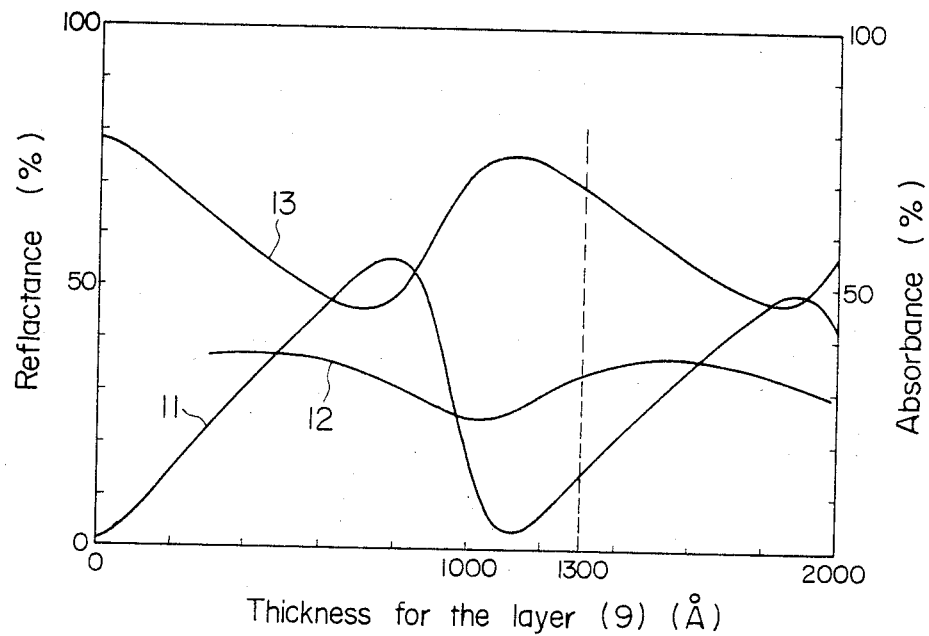
FIG. 3 through 5 are characteristic curves for illustrating the characteristics of the recording medium of the present invention.

The thickness of the light permeable layer 9 in the case where the information recording medium 2 has a first layer 7 composed of Sb$_2$Se$_3$ of about 300 Å thickness, the second layer 8 is made of a Bi$_2$Te$_3$ at about 150 Å thickness, and the reflection layer 10 is made of an Al layer, and the light permeable layer 9 is made of Sb$_2$Se$_3$, the relationship between the reflectance to semiconductor laser beams at 8300 nm wavelength from the substrate 3 and the thickness to the light permeable layer 9 is as shown by the curve 11 in FIG. 3. In this FIGURE the curve 12 shows the result of the measurement for the reflectance in an area where the alloying has resulted in the first and second layers 7 and 8 after recording. Further, the curve 13 in the FIGURE shows the absorbance for the laser beams in the second layer 8.

Thus, the reflectance before and after irradiation, that is, in the not yet recorded region and the recorded region shows the change indicated by the curves 11 and 12. Accordingly, when reading laser beams, for example, having the same wavelength as those of the recording laser beams but a sufficiently smaller power as compared with that of the recording laser beams are irradiated after recording on the same side as that in the recording laser beams, recorded information can be read out at an output level corresponding to the difference in the reflectance. In order to efficiently absorb the writing laser beams irradiated on the side of the substrate 3 into the second layer 8 of the recording layer 6 and convert them into heat, it is effective to reduce the amount of light reflected at the interface between the second layer 8 and the first layer 7 and to decrease the amount of light transmitted through the interface between the layer 8 and the first layer 7. In order to achieve this, the thickness of the first layer 7 is made such that the interference effect due to the multiple reflections can be obtained as described above so that the substantially non-reflective condition can be obtained at the interface between the first and second layers 7 and 8. In addition, the thickness of the light permeable layer 9 is adjusted so as to decrease the amount of light passing through the interface between the second layer 8 and the layer 9 to improve the absorbing efficiency of the laser beams.

It will be seen from FIG. 3 that although the thickness of the light permeable layer 9 is chosen at the vicinity of the bottom of the curve 11 showing a low reflectance, it is actually desired that the thickness be chosen, for example, between about 1200 and 1400 Å and preferably at about 1300 Å so as to obtain a reflectance of greater than 10 to 20% which is necessary for creating servo signals for the auto-focusing and auto-tracking as described above, to provide a great change in the reflectance between the not yet recorded region and the recording region, that is, where the curves 11 and 12 show the greatest difference and, further, to obtain a relatively high absorbance shown by the curve 13.

Figure 4:
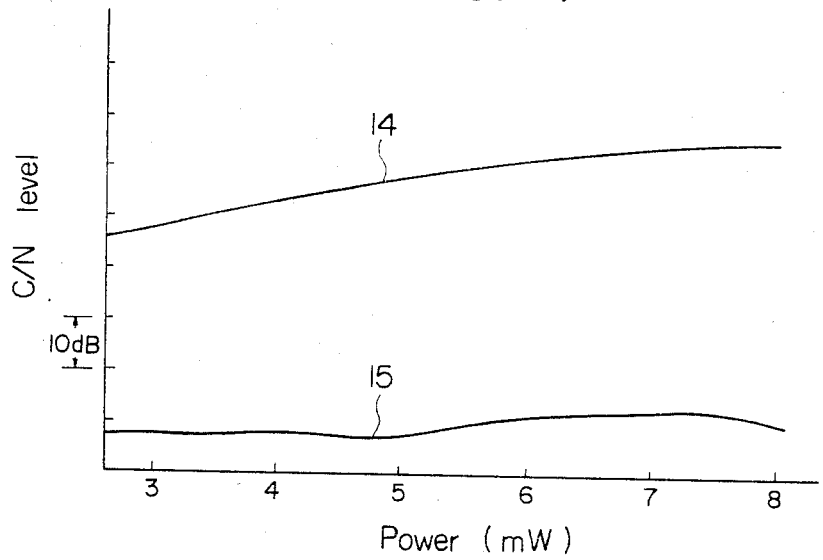

FIG. 4 shows the recording sensitivity characteristic of the medium element 2 in which the light permeable layer 9 has a thickness of 1300 Å. In this instance, the laser beams have a wavelength of 8300 Å and the lens opening number NA is 0.5 in the recording and reproducing apparatus. The recording medium is rotated at 1800 rpm and the recording is performed at 5 MHz for an area of 100 mm radius from the center. In FIG. 3, curves 14 and 15 represent signal and noise components, respectively, which show that the medium provides a high C/N ratio.

In the foregoing embodiment, a pair of information recording medium elements 2 are secured to each other by means of adhesives 4 to provide an information recording medium 1 of the dual face recording type. Since the reflection layer 10 is formed on each of the elements 2 such that the laser beams irradiated on each of the elements may not be leaked externally, there is no mutual effects occurring between the elements and thus no particular consideration is necessary for the optical characteristics of the adhesives 4.

Figure 5:
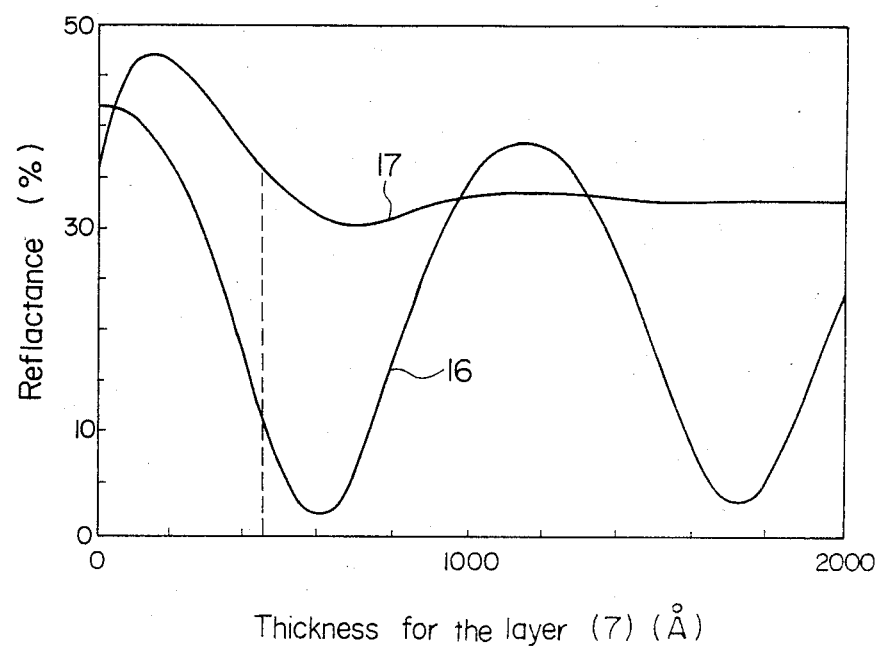

Although the foregoing explanation has been made for a recording medium of the dual face recording type, a single face recording type can also be employed in this invention by providing the medium with a single information recording medium 2. A high melting metal such as Ni, Cr, W, Mo or Ti can be used for the reflection layer 10 so as to suppress the scattering or evaporation of the low melting metal in the second layer 8 of the recording layer 6 around the periphery caused by the heating of the laser irradiation upon recording and thereby avoid the reduction in resolution power caused by a scattering or evaporation. The thickness of the high melting metal layer 10 in this case may be less than about 200 Å, for instance, about 60 Å, so that the heat capacity is not increased very much. FIG. 5 shows the result of the measurement for the relationship between the thickness of the first layer 7 and the reflectance to the laser beams (8300 Å) from the substrate 3 in the recording medium. The first recording layer 7 was made of $Sb_2Se_3$, the second layer 8 was made of $Bi_2Te_3$ of 150 Å thickness and a high melting metal layer 10 made of NiCr layer of 60 Å thickness were employed. The curves 16 and 17 in FIG. 5 show the reflectance before and after the alloying between the first and second layers 7 and 8, respectively, that is, before and after the recording. Also in this case, it is desired that the thickness of the layer 7 be chosen such that the reflectance is greater than 10 to 20% and that there is a substantial difference between both of the curves 16 abnd 17. The desirable thickness of the layer 7 is about 440 Å.

It is also possible to form on a high melting metal layer a metal layer made of material for preventing leaking and reflection of the laser beams permeating the high melting layer, for example, organic dyes such as lead phthalocyanine and tin phthalocyanine.

In the information recording medium according to this invention, since the recording layer 6 comprises first and second layers 7 and 8 and the recording is carried out by alloying the metals in both of the layers under the irradiation of the laser beams, the thickness for the first layer 7 is such that an interference effect is caused due to the repetitive multiple reflections and a great change in the reflectance can be obtained in the recorded region. Consequently, a high contrast and high S/N ratio can be obtained and recording at high sensitivity can be carried out. Furthermore, since the recording is carried out not based on the solid phase solution or crystallization but on alloying due to the melting of the metals that does not proceed even in long time storage, it has an excellent aging stability.

Since the recording and reproduction can be carried out by irradiation of the laser beams on the side of the relatively thick substrate 3, scratches or dusts on the surface can be kept out of the focal depth of the focusing lens system whereby the effect of these defects in the recording system on the recording and reproduction can be avoided.

In the modified embodiment in which a pair of the recording layers 6 are sandwiched between the substrate 3 by a pending paired information recording medium elements 2 as shown in FIG. 1, the deformation, if it results, in the substrates can be offset to each other, whereby all of the drawbacks mentioned previously, for instance, the risk of deformation such as warp and flexure in the information recording medium can effectively be avoided.

It will be evident that various modifications can be made to the described embodiments without departing from the scope of the present invention.

We claim as our invention:

1. An information recording medium for use with focused laser beams modulated with recorded information signals, comprising:
   a substrate having a recording layer which has two layers:
   a first layer formed on said substrate, and
   a second layer formed on said first layer,
   said substrate and said first layer having the property of high transmittance to laser beams,
   said second layer being composed of a metal at least predominantly composed of a low melting metal which absorbs said laser beams and readily forms an alloy with the material of said first layer,
   the thickness of said first layer being such that the reflectance to said laser beams entering from the substrate side is lowered by the interference effect caused by repetitive multiple reflections,
   whereby the metal of said second layer is heated sufficiently to alloy to said first layer due to the focused irradiation of the laser beams from said substrate to said recording layer thereby changing the conditions for said repetitive multiple reflections and changing the amount of reflectance in said recording layer as viewed from said substrate, thereby carrying out the recording of said information.

2. A recording medium according to claim 1 wherein said medium comprises a pair of individual recording elements in inverted relation and secured together at their interface.

3. A recording medium according to claim 1 wherein said first layer is composed of chalcogenide glass.

4. A recording medium according to claim 1 wherein said second layer is composed of Te, Bi, Sb, In or a low melting compound of these metals.

5. A recording medium according to claim 1 wherein the thickness of said first layer is about 440 Å.

6. A recording medium according to claim 1 wherein the thickness of said second layer is in the range of about 100 to 500 Å.

7. A recording medium according to claim 1 which also includes:
   a light permeable layer disposed on said second layer.

8. A recording medium according to claim 7 wherein said light permeable layer is composed of chalcogenide glass.

9. A recording medium according to claim 7 wherein the thickness of said light permeable layer is in the range of about 1200 to 1400 Å.

10. A recording medium according to claim 7 which includes a reflective layer on said light permeable layer.

11. A recording medium according to claim 10 in which said reflective layer is a metal selected from the group consisting of Al, Sn, Ag and Au, having a refractive index and an absorption coefficient greatly different from those of the light permeable layer.

12. A recording medium according to claim 10 wherein said reflective layer is composed of a high melting metal selected from the group consisting of Ni, Cr, W, Mo and Ti, thus preventing the metal of said second layer from scattering or evaporating upon heating caused by irradiation from laser beams.

* * * * *